(12) United States Patent
Ferraz De Souza et al.

(10) Patent No.: US 11,697,107 B2
(45) Date of Patent: Jul. 11, 2023

(54) PROCESS FOR GASIFICATION OF A CARBONACEOUS RAW MATERIAL OF LOW VALUE AS A FUEL USING A NANOCATALYST

(71) Applicant: PETROLEO BRASILEIRO S.A.—PETROBAS, Rio de Janeiro (BR)

(72) Inventors: Wladmir Ferraz De Souza, Rio de Janeiro (BR); Vivian Passos De Souza, Rio de Janeiro (BR); Maira Andrade Rodrigues, Rio de Janeiro (BR); Amanda De Almeida Dumani Dos Santos, Rio de Janeiro (BR)

(73) Assignee: PETROLEO BRASILEIRO S.A.—PETROBRAS, Rio de Janeiro (BR)

( * ) Notice: Subject to any disclaimer, the term of this patent is extended or adjusted under 35 U.S.C. 154(b) by 249 days.

(21) Appl. No.: 17/271,512

(22) PCT Filed: Aug. 2, 2019

(86) PCT No.: PCT/BR2019/050314
§ 371 (c)(1),
(2) Date: Feb. 25, 2021

(87) PCT Pub. No.: WO2020/028963
PCT Pub. Date: Feb. 13, 2020

(65) Prior Publication Data
US 2021/0362129 A1    Nov. 25, 2021

(30) Foreign Application Priority Data
Aug. 9, 2018  (BR) ............... 10 2018 016306 0

(51) Int. Cl.
*B01J 21/18*     (2006.01)
*B01J 23/04*     (2006.01)
(Continued)

(52) U.S. Cl.
CPC ............. *B01J 21/185* (2013.01); *B01J 23/04* (2013.01); *B01J 35/1019* (2013.01);
(Continued)

(58) Field of Classification Search
CPC ...... B01J 21/185; B01J 23/04; B01J 35/1019; B01J 35/1023; B01J 35/1028; B82Y 40/00
(Continued)

(56) References Cited

U.S. PATENT DOCUMENTS

| 3,958,957 A | * | 5/1976 | Koh ...................... C07C 1/0445 518/706 |
| 4,046,523 A | * | 9/1977 | Kalina ..................... C10K 1/08 518/706 |

(Continued)

FOREIGN PATENT DOCUMENTS

| GB | 1596698 A | 8/1981 |
| WO | 2009018053 A1 | 2/2009 |
| WO | 2010033846 A2 | 3/2010 |

OTHER PUBLICATIONS

English translation of International Search Report in International Application No. PCT/BR2019/050314, dated Feb. 13, 2020.
(Continued)

*Primary Examiner* — Patricia L. Hailey
(74) *Attorney, Agent, or Firm* — Raphael Bellum PLLC

(57) ABSTRACT

The present invention describes a mixture comprising carbonaceous raw material of low value as a fuel and a nanocatalyst. The catalytic mixture comprises from 1% to 50% by weight of a nanocatalyst; and from 99% to 50% by
(Continued)

weight of carbonaceous raw material selected from petroleum coke, coal, heavy residual fraction of oil, or a mixture thereof. The nanocatalyst comprises a carbon nanomaterial of between 99.99% and 80% by weight in contents and at least one alkali metal of between 0.01% and 20% by weight in contents, based on the total weight of the nanocatalyst, and the specific surface area of the nanocatalyst ranges between 400 and 1300 m2/g. Furthermore, the present invention also describes a process for gasifying the catalytic mixture which comprises the steps of placing the mixture in a gasifier; heating the mixture in the presence of an oxidizing agent selected from air, pure oxygen, carbon dioxide, water vapor, or a mixture thereof at a temperature ranging between 200 and 1,300° C.; and obtaining a gaseous product comprising H2, CO, CO2, CH4.

15 Claims, 5 Drawing Sheets

(51) Int. Cl.
  *B01J 35/10* (2006.01)
  *B82Y 40/00* (2011.01)
(52) U.S. Cl.
  CPC ....... *B01J 35/1023* (2013.01); *B01J 35/1028* (2013.01); *B82Y 40/00* (2013.01)

(58) Field of Classification Search
  USPC ........ 502/184; 208/400; 48/202, 210, 197 R; 585/240, 943
  See application file for complete search history.

(56) References Cited

U.S. PATENT DOCUMENTS

| | | | |
|---|---|---|---|
| 4,558,027 A * | 12/1985 | McKee | ............... C10J 3/00 502/181 |
| 4,720,289 A | 1/1988 | Vaugh et al. | |
| 2009/0165380 A1* | 7/2009 | Lau | ............... C10L 5/00 502/184 |
| 2010/0168494 A1 | 7/2010 | Rappas et al. | |
| 2010/0299990 A1 | 12/2010 | Aradi et al. | |
| 2015/0299588 A1 | 10/2015 | Spitz et al. | |

OTHER PUBLICATIONS

English translation of International Preliminary Report on Patentability in International Application No. PCT/BR2019/050314, dated Nov. 11, 2020.

Rashidi et al, "Hydrogen rich gas production via supercritical water gasification of sugarcane bagasse using unpromoted and copper promoted Ni/CNT nanocatalysts", Journal of Supercritical Fluids, v. 98, pp. 111-118, Jan. 16, 2015.

* cited by examiner

PROCESS FOR GASIFICATION OF A CARBONACEOUS RAW MATERIAL OF LOW VALUE AS A FUEL USING A NANOCATALYST

FIELD OF THE INVENTION

The present invention refers to the gasification process of carbonaceous material of fossil source in the presence of a nanocatalyst with lower energy consumption.

More specifically, the present invention refers to the gasification process of the mixture comprising a nanocatalyst and a carbonaceous raw material of fossil source of low value as a fuel, such as petroleum coke, coal, heavy residual oil fractions or mixture thereof.

BACKGROUND OF THE INVENTION

The growing global demand for energy, together with its high price, and the constant concerns about the environment are some of the main factors leading to the development of products with high added value from carbonaceous raw materials with low fuel value such as waste from heavy fractions of oil and coal.

The processing of heavy fractions of oil generates a significant amount of vacuum residue (approximately 40% of the total amount of crude oil processed). This residue can also be processed to extract liquid and gaseous fractions through coking processes. The carbonaceous solid residue derived from coking processes is called petroleum coke.

One way to add value to solid carbonaceous raw materials such as coal and petroleum coke is through the gasification process. In the gasification process, the solid raw material is converted into a combustible gaseous product called synthesis gas.

The gaseous product comprises gases such as $CO_2$, $CO$, $H_2$, $CH_4$, $H_2O$, in addition to the possibility of comprising inert gases and several contaminants, such as particulates and tars. The product obtained has a wide range of applications, both in the formation of secondary products such as gasoline and methanol, as well as in energy recovery, generating electricity.

In the gasification process, the thermochemical conversion of the carbonaceous raw material is carried out in the presence of an oxidizing agent, which is usually selected from air, water vapor, $CO_2$, pure $O_2$ or a mixture of thereof. The range of heat value of the gaseous product obtained will depend on the oxidizing agent used.

In addition, the gasification process operates under conditions that limit the complete oxidation of $H_2$ into $H_2O$ and CO to CO2. Some of the main chemical reactions that occur in this process are as follows:

Combustion: $C_nH_m + n\, O_2 = n\, CO_2 + m/2\, H_2$
Partial oxidation: $C_nH_m + n/2\, O_2 = n\, CO + m/2\, H_2$
Methanation: $C_nH_m + 2n\, H_2 = n\, CH_4 + m/2\, H_2$
Shift Reaction, gas/water: $CO + H_2O = CO_2 + H_2$
Methanation—CO: $CO + 3\, H_2 = CH_4 + H_2O$
Steam reform: $C_nH_m + H_2O = n\, CO + (n+m/2)\, H_2$
Dry reform of methane: $CH_4 + CO_2 = 2\, CO + 2\, H_2$ The conversion reactions of the carbonaceous raw material take place in a reactor called a gasifier. The gasifiers usually used are fixed bed, drag bed or fluidized bed.

The reactions occur at typical high temperatures, in the range between 1,200 to 1,600° C., since such solid carbonaceous raw materials have a low volatile content, which makes it difficult the burning thereof.

To achieve conversions under milder conditions of temperature, such as below 900° C., catalysts can be used in the process, which results in lower energy consumption and/or less formation of by-product.

CN 102417835 discloses a process for gasifying a mixture of petroleum coke with a catalyst to obtain a gas rich in hydrogen. Traditional potassium catalysts, such as potassium carbonate, potassium nitrate, potassium acetate, among others, can be used.

However, before the mixture is gasified in the gasification process revealed in the Chinese document, it should undergo a drying process between 105 and 110° C. In addition, it is mentioned that the catalyst of soluble salt present in the gasification residues can be recovered with a water dissolving method.

US 2015/299588 discloses a gasification process in the presence of steam of a mixture of petroleum coke, coal and a gasification catalyst comprising a source of alkali metal.

However, before the gasification of the mixture occurs, the catalyst described in the US document is first impregnated in the coal in the form of a solution, passing through filtration, drying and subsequent mixing steps with the coke.

Thus, it can be noted that, in order to achieve significant yields in the gasification process, the catalysts revealed in the aforementioned documents need to undergo previous steps of preparation to increase the contact area thereof over carbonaceous raw materials and/or further steps of separation of residues.

The use of nanomaterials is an alternative to increase the contact surface of the catalyst over the solid raw material to be gasified, which implies better results in the conversion process.

CN 104741138 discloses a catalytic composition comprising an active mesoporous nanomaterial of phosphorus-aluminum-silica with a specific surface area between 200-600 $m^2/g$. This composition can be applied to the gasification of heavy fractions of oil.

However, the nanomaterial used in the catalytic composition of the Chinese patent document mentioned before has a different chemical source than petroleum, which may result in a greater generation of residues at the end of the process or in the need to separate the nanomaterial in later steps of the reaction.

In this sense, it is an object of the present invention to provide a catalytic mixture allowing the gasification of carbonaceous raw materials with low fuel value under milder conditions. The catalytic mixture of the present invention avoids the need for prior preparation steps or for further separation of products and by-products generated.

SUMMARY OF THE INVENTION

The main objective of present invention is to provide a mixture comprising a carbonaceous raw material of low value as a fuel from fossil source and a nanocatalyst.

In order to achieve the object above, the present invention provides a mixture comprising:

from 1% to 50% of a nanocatalyst consisting of a carbon nanomaterial in a content between 99.99% and 80% by weight and at least one alkali metal in a content between 0.01% and 20% by weight, based on the total weight of the nanocatalyst, wherein the specific surface area of the nanocatalyst varies between 400 and 1300 $m^2/g$;

from 99 to 50% of carbonaceous raw material of fossil source selected from petroleum coke, coal, heavy fraction of oil or mixture thereof.

The present invention also provides a process for gasifying the mixture described herein to obtain a gaseous product.

The process comprises the following steps: introducing the mixture into a gasifier; heating the mixture with an oxidizing agent selected from air, pure oxygen, carbon dioxide, water vapor or a mixture thereof to a temperature ranging between 200 and 1,300° C.; and obtaining a gaseous product comprising $H_2$, CO, $CO_2$, $CH_4$.

BRIEF DESCRIPTION OF THE FIGURES

The detailed description below refers to the attached figures, which.

DETAILED DESCRIPTION OF THE INVENTION

Figure 1:
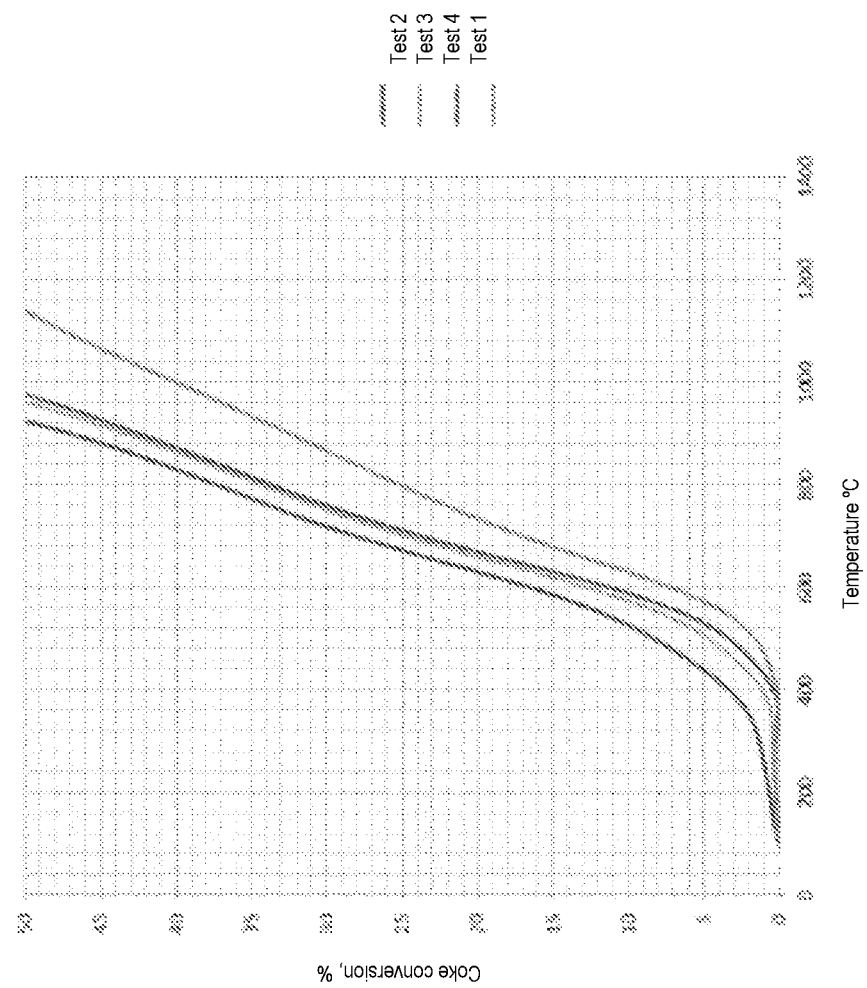
FIG. 1 depicts the graph of conversion (%) of samples comprising petroleum coke in the range of 0 to 50% according to the temperature variation (° C.).

The present invention refers to a mixture comprising carbonaceous raw material of fossil source of low value as a fuel and a nanocatalyst. The mixture comprises from 1% to 50% by weight of a nanocatalyst and from 99 to 50% by weight of carbonaceous raw material, based on the total weight of the mixture.

The nanocatalyst used in the mixture of the present invention consists of a carbon nanomaterial containing at least one alkali metal.

Carbon nanomaterial is present in a content between 99.99% and 80% by weight, and at least one alkali metal is present in a content between 0.01% and 20% by weight, based on the total weight of the nanocatalyst. Preferably, the carbon nanomaterial is present in the nanocatalyst in a content between 99.99% and 95% by weight and at least one alkali metal in a content between 0.01% and 5% by weight.

The specific surface area of the nanocatalyst in the mixture described herein is greater than 400 $m^2/g$, ranging between 400 and 1,300 $m^2/g$. Preferably, the specific surface area of the nanocatalyst is between 500 and 800 $m^2/g$.

The carbon nanomaterial present in the nanocatalyst of the invention described herein comes from petroleum fractions as carbon sources and can be obtained through usual processes already described in the state of the art. Carbon nanomaterial is selected from nanospheres, nanofilaments, nanotubes or graphenes.

In a preferred embodiment of the present invention, carbon nanospheres or nanofilaments are used in the nanocatalyst, which are obtained from heavy fractions of oil according to the process described in PI 0806065-7, which is incorporated by reference.

The carbon nanomaterial exhibits over the entire specific surface area of the nanocatalyst, regions made up of polycondensed aromatic ring systems. These regions can provide attractive intermolecular interactions of the π-π type having aromatic structures of the carbonaceous raw material dispersed in the reaction medium during the gasification process.

The intermolecular interactions mentioned above allow the optimization of the contact of these aromatic structures with the catalytic sites of alkali metals present on the nanocatalyst surface, which makes it possible to achieve better conversion results for the carbonaceous raw material to be gasified.

Any alkali metal can be used in the nanocatalyst of the present invention. In a preferred embodiment, at least one alkali metal is selected from sodium, potassium, rubidium and cesium. Most preferably, potassium is used.

Thus, the nanocatalyst present in the mixture combines the great specific surface area of carbon nanomaterials with the presence of alkali metal catalytic sites favorable to the gasification reaction.

The carbonaceous raw material present in the catalytic mixture is selected from petroleum coke, coal or mixture thereof. Preferably, petroleum coke is used as a carbonaceous raw material.

The present invention also provides a process for gasifying the catalytic mixture described herein.

The process comprises the following steps:
introducing the catalytic mixture in an gasifier;
heating the mixture in the presence of an oxidizing agent selected from air, pure oxygen, carbon dioxide, water vapor or a mixture thereof to a temperature ranging between 200 and 1,300° C.: and
obtaining a gaseous product comprising $H_2$, CO, $C_2$, $CH_4$.

Preferably, the temperature range used in the heating step of the process ranges between 900 and 1,200° C.

In the context of the present invention, the term "gasifier" refers to any type of gasifier present in the state of the art, such as fixed bed gasifier, fluidized bed gasifier or indirect gasifier.

In a way of implementing the gasification process described herein, the gaseous product obtained further comprises, in lower ratios, hydrocarbon compounds.

In an alternative embodiment, the oxidizing agent may be diluted in an inert gas, such as a noble gas.

The process of present invention, when compared with conventional processes described in the prior art, can achieve greater conversions at the same temperature or further similar conversions at lower temperatures.

Thus, the gasification process disclosed herein allows greater energy gain, in addition to allowing less generation of residues, since the nanocatalyst used has the same chemical nature as the carbonaceous raw material.

The following description will start from preferred embodiments of the invention. As will be apparent to any person skilled in the art, the invention is not limited to these embodiments in particular.

EXAMPLES

Three tests of the gasification process of present invention were carried out using the catalytic mixture described herein. Two comparative tests were also carried out, one using a traditional material (herein called as inert) and the other without a nanocatalyst (only pure petroleum coke).

Test 1—Gasification Process Having Petroleum Coke and 50% Inert

A sample with petroleum coke was mixed in equal parts with a commercial alpha alumina with approximately 2 $m^2/g$ of specific surface area measured by BET, hereinafter referred to as inert.

The sample of 50% inert and 50% coke was heated in a flow of a gas mixture of synthetic air (19.4%), helium (77.6%) and water vapor (3%), the latter being fed by a saturator maintained at 24° C. The temperature range used was from 50 to 1.200° C. at a rate of 10° C./min.

Test 2—Gasification Process Having Nanocatalyst and 50% Coke

The sample tested was a catalytic mixture of petroleum coke and the nanocatalyst of the present invention. The carbon nanomaterial present in the tested nanocatalyst is in the form of nanospheres.

The sample was heated in a flow of a gaseous mixture of synthetic air (19.4%), Helium (77.6%) and water vapor (3%), the latter being fed by a saturator maintained at 24° C. The temperature range used was of 50 to 1,200° C. at a rate of 10° C./min.

Test 3—Gasification Process Having 25% Nanocatalyst and 75% Coke

The sample tested was the catalytic mixture comprising 75% petroleum coke and 25% nanocatalyst. The carbon nanomaterial present in the nanocatalyst tested is in the form of nanospheres.

The sample was heated in a flow of a gaseous mixture of synthetic air (19.4%), Helium (77.6%) and water vapor (3%), the latter being fed by a saturator maintained at 24° C. The temperature range used was of 50 to 1,200° C. at a rate of 10° C./min.

Test 4—Gasification Process Having 12.5% Nanocatalyst and 87.5% Coke

The sample tested was the catalytic mixture comprising 87.5% petroleum coke and 12.5% nanocatalyst. The carbon nanomaterial present in the tested nanocatalyst is in the form of nanospheres.

The sample was heated in a flow of a gaseous mixture of synthetic air (19.4%), Helium (77.6%) and water vapor (3%), the latter being fed by a saturator maintained at 24° C. The temperature range used was de 50 to 1.200° C. at a rate of 10° C./min.

Test 5—Gasification Process Having 100% Pure Coke

The sample tested was pure coke, absent from any catalyst. The sample was heated in a flow of a gas mixture of synthetic air (19.4%), Helium (77.6%) and water vapor (3%), the latter being fed by a saturator maintained at 24° C. The temperature range used was of 50 to 1,200° C. at a rate of 10° C./min.

Comparative Results

First, the value of 50% conversion of the samples was considered, this conversion being measured by the loss of mass in the TGA.

It can be seen in FIG. 1 that the presence of nanocatalysts containing carbon nanospheres in different proportions resulted in greater conversions from 400° C. in test 4, from 380° C. in test 3 and from 200° C. in test 2.

In addition, it can also be seen in FIG. 1 that the value of 50% conversion of the sample was reached at a temperature of 917° C. during test 2, close to 970° C. during tests 3 and 4 and only in the temperature of 1,137° C. in test 1.

It is verified, then, that it was necessary to provide 220° C. more in the temperature of the gasification process using a sample of coke and inert to achieve the same conversion of test 2.

Thus, it is observed that the gasification process of test 2 occurs at a lower temperature, which results in savings in the supply of energy to the process, in addition to lower operating costs.

Figure 2:
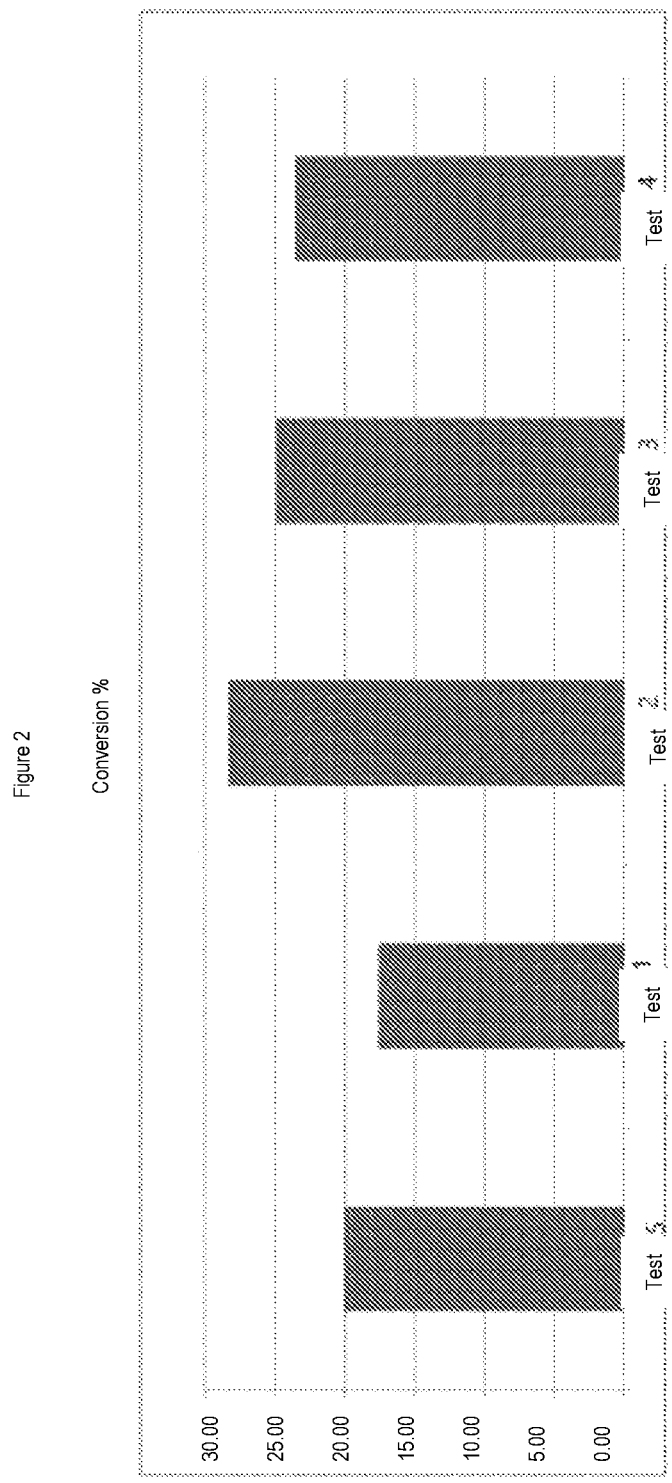
FIG. 2 depicts the graph of conversion (%) of samples comprising petroleum coke at a temperature of 700° C.
Figure 3:
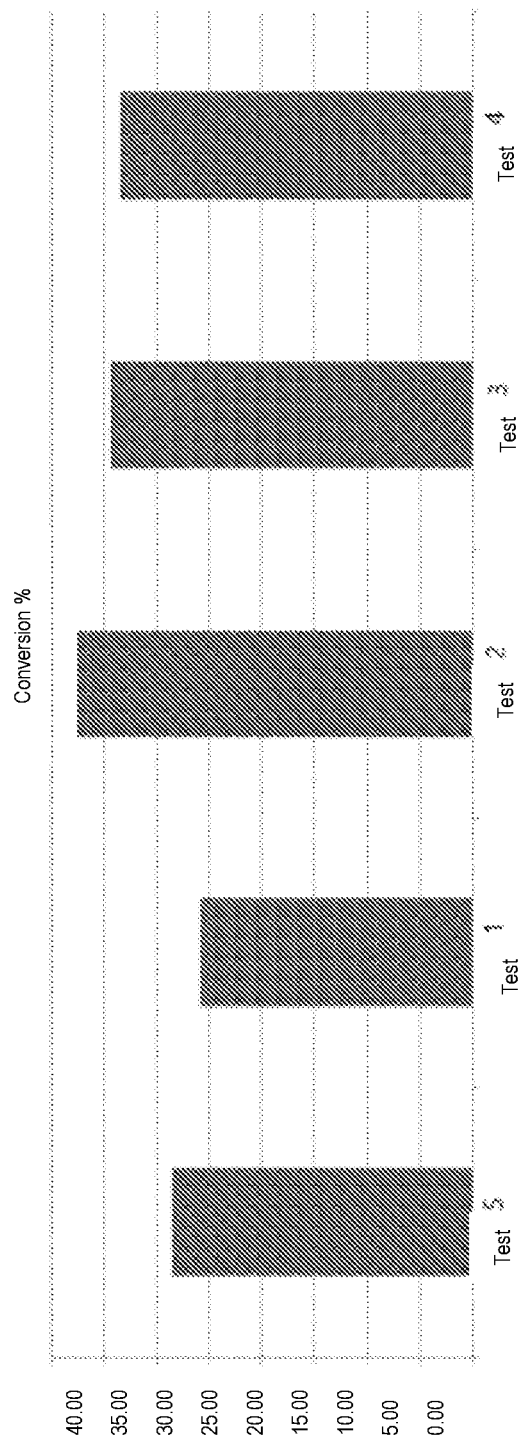
FIG. 3 depicts the graph of conversion (%) of samples comprising petroleum coke at a temperature of 800° C.
Figure 4:
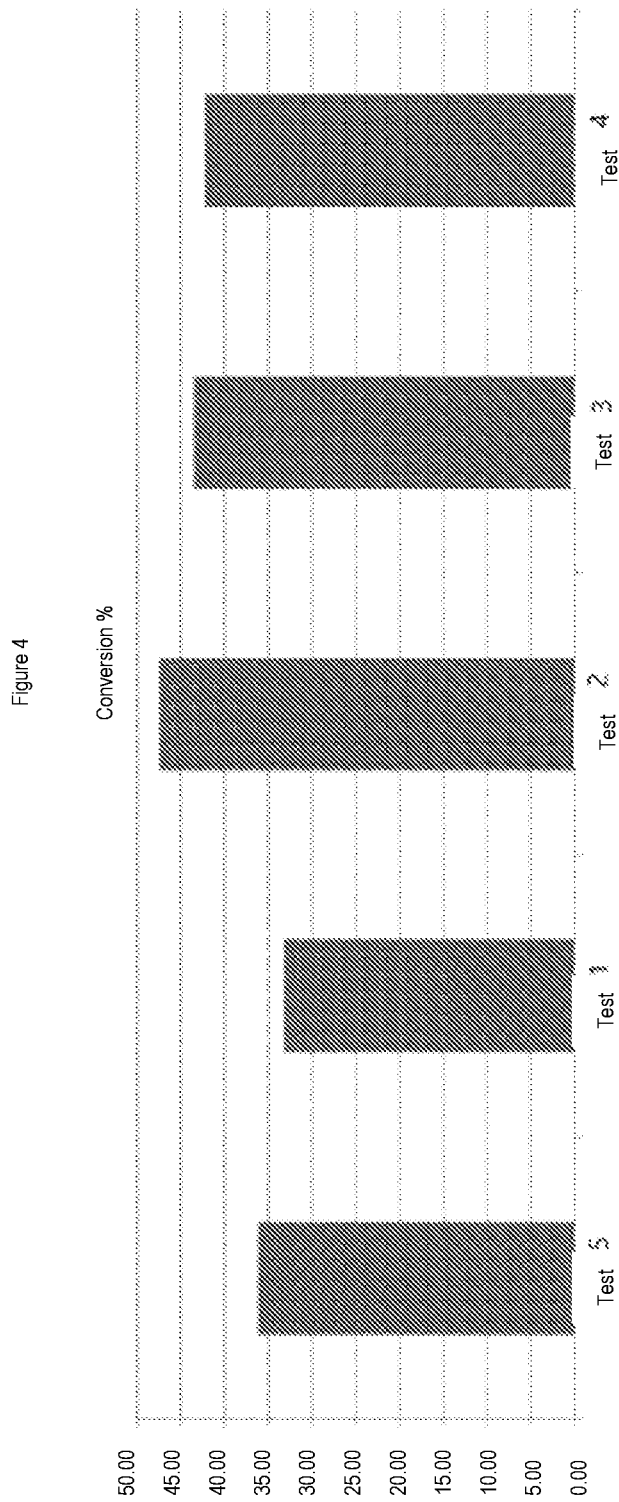
FIG. 4 depicts the graph of conversion (%) of samples comprising petroleum coke at 900° C.

FIGS. 2, 3 and 4 depict the conversion of the samples, according to tests 1 to 5, at temperatures of 700° C., 800 and 900° C., respectively.

It is noted that the conversion of the samples is greater the higher the process temperature, according to tests 1 to 5. At the temperature of 900° C. (FIG. 4), it is noted that 47% of the test sample 2 were converted and only 33% of the sample of test 1.

It is also noted that test 2 (sample of the catalytic mixture with 50% nanocatalyst and 50% petroleum coke) shows the highest conversion at all temperatures evaluated.

Likewise, it is noted that tests 3 and 4, in which the nanocatalyst is used in smaller proportions, exhibits sample conversion values close to the result obtained in test 2 at the evaluated temperatures.

Figure 5:
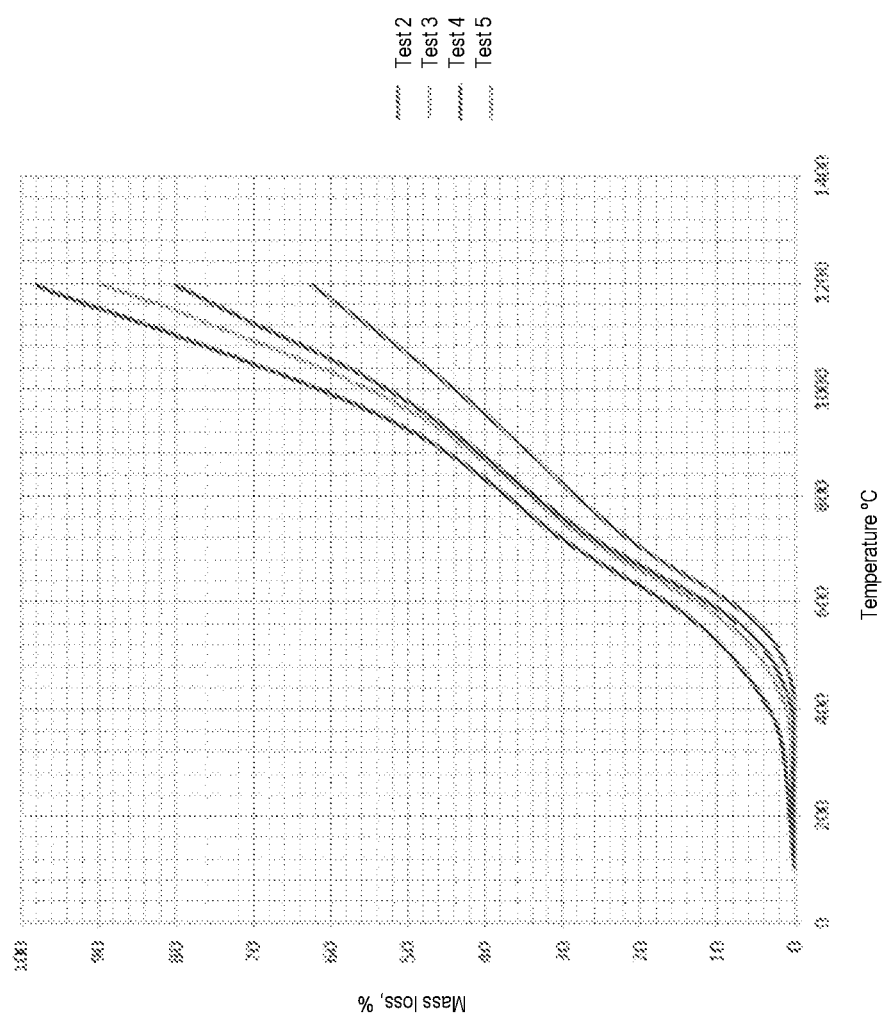
FIG. 5 depicts the graph of the conversion (%) of samples comprising petroleum coke in the range of 0 to 100% according to the temperature variation (° C.).

In FIG. 5, it is noted that the maximum conversion of the sample of test 5 at the temperature of 1.200° C. is only 63%.

At that same temperature, it is noted that the conversion of the sample of test 2 is of 98%, that is, the catalytic mixture with coke and nanocatalyst in the proportion of 50% was almost all converted into a gaseous product comprising $H_2$, $CO$, $CO_2$, $CH_4$. Thus, the formation of residues in the gasification process is minimized.

It is also noted that the maximum conversion achieved by tests 3 and 4 at 1,200° C. is of 90% and 80%, respectively.

Therefore, it was possible to demonstrate that the gasification process according to the present invention obtains greater conversions at the same temperature or further equal conversions at a lower temperature compared to processes not using the catalytic mixtures described herein.

The description that has been made so far of the object of the present invention should be considered only as a possible embodiment or possible embodiments, and any specific characteristic introduced therein should be understood only as something that has been written to facilitate understanding.

Thus, it is emphasized the fact that several variations involving the scope of protection of this application are allowed, the present invention not being limited to the specific configurations/embodiments described above.

The invention claimed is:

1. A catalytic mixture comprising:
   from 1% to 50% by weight of a nanocatalyst; and
   from 99% to 50% by weight of carbonaceous raw material of low value as a fuel selected from petroleum coke, coal, residual heavy fraction of petroleum, and a mixture thereof, based on the total weight of the catalytic mixture,
   wherein the nanocatalyst consists of a carbon nanomaterial in an amount between 99.99% and 80% by weight and at least one alkali metal in an amount between 0.01% and 20% by weight, based on the total weight of the nanocatalyst, and the specific surface area of the nanocatalyst varies between 400 and 1,300 $m^2/g$.

2. The catalytic mixture according to claim 1, wherein the nanocatalyst consists of the carbon nanomaterial in an amount between 99.99% and 95% by weight and the at least one alkali metal in an amount between 0.01% and 5% by weight, based on the total weight of the nanocatalyst.

3. The catalytic mixture according to claim 1, wherein the specific surface area of the nanocatalyst varies between 500 and 800 $m^2/g$.

4. The catalytic mixture according to claim 1, wherein the carbon nanomaterial is selected from nanospheres, nanofilaments, nanotubes, and graphenes.

5. The catalytic mixture according to claim 4, wherein the carbon nanomaterial is selected from nanospheres, and nanofilaments.

6. The catalytic mixture according to claim 1, wherein the at least one alkali metal is selected from sodium, potassium, rubidium, and cesium.

7. The catalytic mixture according to claim 6, wherein the at least one alkali metal is potassium.

8. The catalytic mixture according to claim 1, wherein the carbonaceous raw material is petroleum coke, coal, or a mixture thereof.

9. The catalytic mixture according to claim 8, wherein the carbonaceous raw material is petroleum coke.

10. The catalytic mixture according to claim 8, wherein the carbonaceous raw material is coal.

11. The catalytic mixture according to claim 1, wherein the mixture comprises 50% of the nanocatalyst and 50% of the carbonaceous raw material.

12. A gasification process of the catalytic mixture of claim 1, comprising the following steps:
   introducing the catalytic mixture in a gasifier;
   heating the catalytic mixture in the presence of an oxidizing agent selected from air, pure oxygen, carbon dioxide, water vapor, and a mixture thereof to a temperature ranging between 200 and 1300° C.; and
   obtaining a gaseous product comprising $H_2$, $CO$, $CO_2$, and $CH_4$.

13. The process according to claim 12, wherein the step of heating the catalytic mixture is carried out at a temperature range between 900 and 1,200° C.

14. The process according to claim 12, wherein the oxidizing agent is diluted in an inert gas.

15. The catalytic mixture according to claim 1, wherein the carbonaceous raw material is residual heavy fraction of petroleum.

* * * * *